(12) United States Patent
Gao et al.

(10) Patent No.: US 11,850,622 B2
(45) Date of Patent: Dec. 26, 2023

(54) COATING APPARATUS AND COATING SYSTEM

(71) Applicant: JIANGSU CONTEMPORARY AMPEREX TECHNOLOGY LIMITED, Changzhou (CN)

(72) Inventors: Xiaoliang Gao, Changzhou (CN); Xiaokang Yan, Changzhou (CN); Xing Wang, Changzhou (CN); Tuo Zheng, Changzhou (CN); Shisong Li, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/340,909

(22) Filed: Jun. 26, 2023

(65) Prior Publication Data

US 2023/0330694 A1    Oct. 19, 2023

Related U.S. Application Data

(63) Continuation of application No. PCT/CN2022/124908, filed on Oct. 12, 2022.

(30) Foreign Application Priority Data

Nov. 2, 2021   (CN) .......................... 202122660697.3

(51) Int. Cl.
   *B05C 11/10*    (2006.01)
   *B05C 1/02*     (2006.01)

(52) U.S. Cl.
   CPC ............ *B05C 11/1018* (2013.01); *B05C 1/02* (2013.01)

(58) Field of Classification Search
   None
   See application file for complete search history.

(56) References Cited

U.S. PATENT DOCUMENTS

| 2,751,313 A | * | 6/1956 | Speed | G11B 5/842 |
| | | | | 118/712 |
| 4,251,566 A | * | 2/1981 | Gingerich | D06B 23/28 |
| | | | | 118/712 |

(Continued)

FOREIGN PATENT DOCUMENTS

| CN | 104858106 A | 8/2015 |
| CN | 205851236 U | 1/2017 |

(Continued)

OTHER PUBLICATIONS

International Search Report received in the corresponding International Application PCT/CN2022/124908, dated Jan. 17, 2023.

(Continued)

*Primary Examiner* — Jethro M. Pence
(74) *Attorney, Agent, or Firm* — Kilpatrick Townsend & Stockton LLP

(57) ABSTRACT

Provided are a coating apparatus and a coating system, where the coating apparatus includes: a coating module, the coating module including a coating roller and a coating die, where the coating roller is configured to drive, when rotating, a substrate to move toward the coating die, and the coating die is configured to apply a coating onto the substrate; an error acquisition module having a predetermined distance to the coating roller and configured to acquire a circular run-out error of rotation of the coating roller and transmit the circular run-out error to a linkage module; and the linkage module configured to adjust position of the coating die in real time according to the circular run-out error transmitted to the linkage module, so as to keep a distance between the coating roller and the coating die unchanged.

9 Claims, 6 Drawing Sheets

(56) References Cited

U.S. PATENT DOCUMENTS

| | | | | | |
|---|---|---|---|---|---|
| 4,737,378 | A | * | 4/1988 | Narita | G03F 7/16 |
| | | | | | 118/712 |
| 5,162,131 | A | * | 11/1992 | Rantanen | G01B 15/02 |
| | | | | | 118/712 |
| 5,376,402 | A | * | 12/1994 | Louks | B05C 9/08 |
| | | | | | 118/712 |
| 5,401,529 | A | * | 3/1995 | Wollam | B05C 5/0254 |
| | | | | | 118/712 |
| 5,584,932 | A | * | 12/1996 | Clark | B32B 37/1284 |
| | | | | | 118/712 |
| 5,674,552 | A | * | 10/1997 | Ohira | B05D 7/146 |
| | | | | | 118/712 |
| 5,698,034 | A | * | 12/1997 | Clark | B32B 37/1284 |
| | | | | | 118/712 |
| 5,743,964 | A | * | 4/1998 | Pankake | B05C 1/0826 |
| | | | | | 118/712 |
| 6,582,768 | B2 | * | 6/2003 | Mandai | B05C 9/06 |
| | | | | | 118/712 |
| 6,863,730 | B2 | * | 3/2005 | Trabold | G03G 5/0525 |
| | | | | | 118/712 |
| 8,220,411 | B2 | * | 7/2012 | Yoshino | B05C 1/0873 |
| | | | | | 118/712 |
| 8,297,221 | B2 | * | 10/2012 | Jackson | B05C 11/1015 |
| | | | | | 118/419 |
| 8,821,960 | B2 | * | 9/2014 | Jackson | B05C 11/1015 |
| | | | | | 118/419 |
| 8,960,123 | B2 | * | 2/2015 | Brophy | C23C 18/1241 |
| | | | | | 118/712 |
| 9,486,828 | B2 | * | 11/2016 | Miura | B05C 5/005 |
| 10,006,124 | B2 | * | 6/2018 | De Vries | B05C 3/02 |
| 10,207,290 | B2 | * | 2/2019 | Jing | B05C 1/00 |
| 11,772,119 | B2 | * | 10/2023 | Lee | H01M 4/0404 |
| | | | | | 118/315 |
| 2001/0032586 | A1 | * | 10/2001 | Katagiri | B05C 11/00 |
| | | | | | 118/712 |
| 2014/0196662 | A1 | * | 7/2014 | Prieto | B23K 9/048 |
| | | | | | 118/712 |
| 2014/0234539 | A1 | * | 8/2014 | Kitani | B29C 48/31 |
| | | | | | 118/712 |
| 2015/0010713 | A1 | * | 1/2015 | Kim | B05B 13/0436 |
| | | | | | 118/712 |
| 2018/0178242 | A1 | | 6/2018 | Zhan et al. | |
| 2023/0118174 | A1 | * | 4/2023 | Sung | H01M 10/0404 |
| | | | | | 356/635 |
| 2023/0330694 | A1 | * | 10/2023 | Gao | B05C 11/1018 |

FOREIGN PATENT DOCUMENTS

| | | |
|---|---|---|
| CN | 112916326 A | 6/2021 |
| CN | 216323035 U | 4/2022 |
| JP | 2005000883 A | 1/2005 |

OTHER PUBLICATIONS

Written Opinion received in the corresponding International Application PCT/CN2022/124908, dated Jan. 17, 2023.

* cited by examiner

COATING APPARATUS AND COATING SYSTEM

CROSS-REFERENCE TO RELATED APPLICATIONS

This application is a continuation of International Application PCT/CN2022/124908, filed Oct. 12, 2022, which claims priority to Chinese Patent Application No. 202122660697.3, filed on Nov. 2, 2021 and entitled "COATING APPARATUS AND COATING SYSTEM", which is incorporated herein by reference in its entirety.

TECHNICAL FIELD

Embodiments of this application relate to the field of battery manufacturing technologies, and in particular, to a coating apparatus and a coating system.

BACKGROUND

Lithium-ion traction batteries have gradually occupied a large market of battery power by virtue of high energy density, long service life, and environmental friendliness. Electrode plates, as a basis of lithium-ion traction batteries, determine the electrochemical performance of lithium-ion traction batteries, and battery failure caused by the electrode plate coating process accounts for up to 10% of total failures of lithium-ion traction batteries.

A coating process is a step next to the preparation of slurry, mainly referring to applying the prepared uniform slurry onto the positive electrode and negative electrode current collectors. In the coating process, the slurry is applied in extremely small thickness, and accordingly, the slurry finally applied on the current collectors tends to be uneven in thickness, impacting electrochemical performance of electrode plates. Electrode plates determine the final performance in cycling, C-rate, and safety of lithium-ion traction batteries, and parameters of the coating process impact performance of the electrode plates to a great extent. Therefore, a coating apparatus is urgently required to resolve the problem of uneven coating thickness of slurry in the coating process.

SUMMARY

In view of the preceding problem, embodiments of this application provide a coating apparatus and a coating system, so as to resolve the problem of uneven coating thickness caused by fluctuation of equipment during operation in the coating process.

According to an aspect of the embodiments of this application, a coating apparatus is provided and includes:
  a coating module, the coating module including a coating roller and a coating die, where the coating roller is configured to drive, when rotating, a substrate to move toward the coating die, and the coating die is configured to apply a coating onto the substrate;
  an error acquisition module, having a predetermined distance to the coating roller and configured to acquire a circular run-out error of rotation of the coating roller and transmit the circular run-out error to a linkage module; and
  a linkage module, configured to adjust position of the coating die in real time according to the circular run-out error transmitted to the linkage module, so as to keep a distance between the coating roller and the coating die unchanged.

The error acquisition module acquires the circular run-out error produced during operation of the coating roller, such that the linkage module can directly adjust the position of the coating die in real time according to the circular run-out error, so as to keep the distance between the coating roller and the coating die unchanged, thereby ensuring a constant thickness of the coating applied when the substrate goes through the coating die.

In some embodiments, the linkage module includes:
  an error compensation module, configured to push, according to the circular run-out error, a displacement transfer module to produce displacement; and
  the displacement transfer module, fixedly connected to the coating die, where displacement of the displacement transfer module pushes the coating die to move so as to adjust the position of the coating die.

The error compensation module is able to produce corresponding displacement according to the circular run-out error, thereby pushing the displacement transfer module to produce corresponding displacement. The displacement transfer module is fixedly connected to the coating die, and accordingly, displacement of the displacement transfer module pushes the coating die to correspondingly move, so as to adjust the position of the coating die in real time according to the circular run-out error.

In some embodiments, the error compensation module includes:
  a signal converter, configured to convert the circular run-out error into a voltage signal and transmit the voltage signal to a piezoelectric ceramic; and
  the piezoelectric ceramic, deforming when receiving the voltage signal and configured to push the displacement transfer module to produce displacement.

With the signal converter converting a digital signal of the circular run-out error into the voltage signal and inputting the voltage signal into the piezoelectric ceramic, the piezoelectric ceramic correspondingly has a deformation amount under the action of the voltage signal, so as to push a first slider tightly attached to the piezoelectric ceramic to move. The piezoelectric ceramic and the signal converter cooperate to accurately adjust the position of the coating die according to the circular run-out error, featuring a simple structure and high accuracy.

In some embodiments, the displacement transfer module includes:
  an elastic member, fastened to the piezoelectric ceramic, where deformation of the piezoelectric ceramic pushes the elastic member to deform; and
  a sliding module in contact with the elastic member, where deformation of the elastic member pushes the sliding module to have displacement;
  where the sliding module is fastened to the coating die and configured to push the coating die to move when the sliding module is having displacement.

The elastic member fastened to the piezoelectric ceramic is provided such that deformation of the piezoelectric ceramic can be accurately sensed, increasing accuracy of transferring micro-deformation displacement, and the elastic member is fastened to the piezoelectric ceramic such that the elastic member deforms with the piezoelectric ceramic, further ensuring accuracy of movement caused by the sliding module. Deformation of the elastic member pushes the sliding module in contact therewith to move, so as to adjust the position of the coating die fixedly connected to the sliding module.

In some embodiments, the sliding module includes:
- a first slider in contact with the elastic member, where deformation of the elastic member pushes the first slider to have displacement; and
- a second slider, having one surface in contact with the first slider and another surface fastened to the coating die, where displacement of the first slider pushes the second slider to have displacement, and displacement of the second slider pushes the coating die to move to adjust the position of the coating die.

The first slider is in contact with the elastic member such that the first slider has displacement under the action of forces when the elastic member deforms, so as to push the second slider in contact with the first slider to have displacement, and because the second slider is mutually fastened to the coating die, the coating die is pushed to move so as to adjust the position of the coating die.

In some embodiments, the displacement transfer module includes:
- a first needle roller, gripped between the first slider and the second slider.

The first needle roller is provided between the first slider and the second slider such that surface contact between the first slider and the second slider is avoided, increasing durability of the equipment. In addition, the first needle roller transfers an acting force such that the first slider can push the second slider to have corresponding displacement in a relatively small force, facilitating accurately adjusting a position of the second slider according to the circular run-out error, providing higher efficiency of transferring a pushing force, and effectively and accurately adjusting the position of the coating die.

In some embodiments, the first needle roller is fastened on the first slider or the second slider so as to prevent the first needle roller from dropping.

The first needle roller being fastened on the first slider or the second slider prevents the first needle roller from dropping from between the first slider and the second slider during movement of the first slider or the second slider and provides a firmer structure and a better cooperation among the first slider, the second needle roller, and the second slider, increasing reliability of the coating apparatus.

In some embodiments, the coating apparatus further includes:
- a mounting base, configured to fasten the piezoelectric ceramic; and
- a threaded rod, configured to fasten the piezoelectric ceramic to the mounting base.

The piezoelectric ceramic is fastened to the mounting base such that movement space of the piezoelectric ceramic can be restricted, so as to restrict movement space of the elastic member fastened to the piezoelectric ceramic and of the first slider disposed in contact with the elastic member, thereby increasing reliability of the equipment. The piezoelectric ceramic module is fastened to the mounting base through the threaded rod, such that a position of the piezoelectric ceramic can be adjusted more flexibly, so as to adjust the position of the elastic member fastened to the piezoelectric ceramic, restrict movement range and trajectory of the first slider in contact with the elastic member, and prevent the case that the second slider is unable to be pushed to have displacement due to the first slider detaching from a predetermined displacement track, thus impacting adjustment of the position of the coating die.

In some embodiments, the coating apparatus further includes:
- a second needle roller gripped between the first slider and the mounting base.

The second needle roller is provided between the first slider and the mounting base, such that the reacting force of the first needle roller on the first slider is counteracted; and the second needle roller is gripped between the first slider and an inner side wall of the mounting base, such that the reacting force can be counteracted and friction between the mounting base and the second needle roller can be reduced.

In some embodiments, the coating apparatus further includes:
- a fastening apparatus, configured to fasten the coating die.

With the coating die fastened through the fastening apparatus, the coating die is pushed to move during movement of the displacement transfer module, so as to adjust the position of the coating die.

In some embodiments, the error acquisition module includes:
- a displacement sensor, having the predetermined distance to the coating roller, where the displacement sensor is configured to measure a position change of the coating roller, and the position change indicates the circular run-out error.

The displacement sensor having the predetermined distance to the coating roller determines the distance between the coating roller and the displacement sensor, such that the circular run-out error of the coating roller can be directly obtained by calculating the distance between the coating roller and the displacement sensor and the predetermined distance.

According to another aspect of the embodiments of this application, a coating system is provided and includes a move apparatus and the coating apparatus according to any one of embodiments in the first aspect.

The move apparatus is configured to move the coating die to a predetermined position before the coating roller drives the substrate to move toward the coating die.

The coating die of the coating apparatus is moved to a predetermined position through the move apparatus, such that the position of the coating die is able to be fixed flexibly and accurately based on needs, avoiding adverse factors in addition to the circular run-out error presented between the coating roller and the coating die, thereby increasing coating efficiency of the coating apparatus.

In the embodiments of this application, the error acquisition module acquires the circular run-out error of the coating roller, and the linkage apparatus adjusts the position of the coating die in real time according to the circular run-out error, such that the coating die moves in a direction of the circular run-out of the coating roller to have displacement with the same magnitude as the circular run-out error, so as to cancel fluctuation in the distance between the coating roller and the coating die caused by the circular run-out of the coating roller, thereby ensuring that the distance between the coating roller and the coating die is kept unchanged so as to achieve even thickness of the coating applied onto the substrate by the coating die.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are indicated by same accompanying symbols. In the accompanying drawings.

Figure 1:
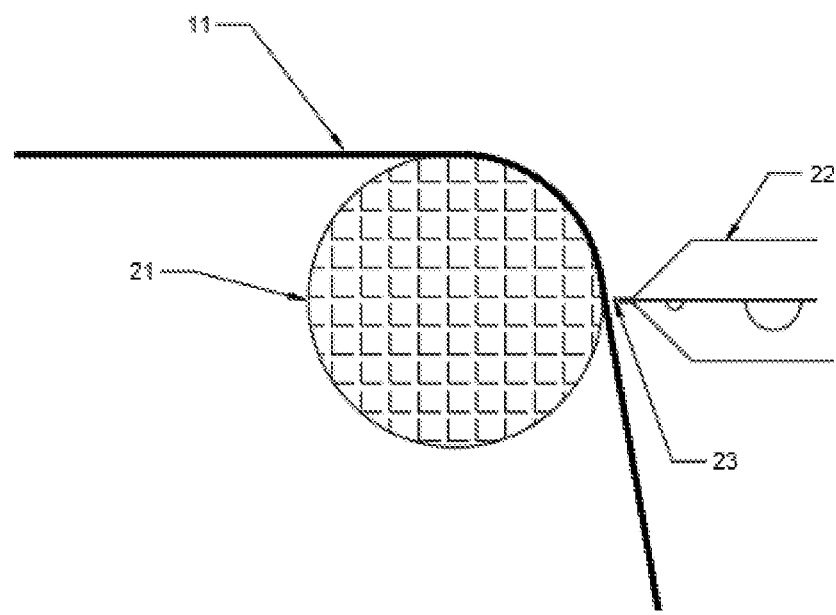
FIG. 1 is a schematic structural diagram of a coating die according to an embodiment of this application.

REFERENCE SIGNS 1. coating apparatus; 11. substrate; 12. coating; 13. circular run-out error; 2. coating module; 21. coating roller; 22. coating die; 23. discharge port; 3. error acquisition module; 31. displacement sensor; 32. support; 4. linkage module; 41. error compensation module; 42. displacement transfer module; 411. signal converter; 412. piezoelectric ceramic; 421. elastic metal sheet; 422. sliding module; 4221. first slider; 42211. first inclined surface; 4222. second slider; 42221. second inclined surface; 423. first needle roller; 5. mounting base; 51. accommodating chamber; 52. inner side wall; 53 threaded rod; 6. second needle roller; 7. fastening apparatus; 71. first side of fastening apparatus; 72. second side of fastening apparatus; 73. base plate; 74. screw; 8. coating system; 81. move apparatus; 82. servo motor; 83. air cylinder.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the descriptions of embodiments of this application, the term "and/or" in this application describes only an association relationship for describing associated objects and represents that three relationships may exist. For example, A and/or B may represent the following three cases: A alone, both A and B, and B alone. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

As the environmental concern grows, new energy has appeared in the public vision with its unique advantages of energy conservation and environmental protection. Therefore, people are gradually abandoning conventional energy such as coals and petroleum which pollutes the environment and choose the more environmentally-friendly new energy. Lithium-ion traction batteries, as one of the new energy, have gradually occupied a large market of battery power by virtue of their advantages such as high energy density, long service life, and environmental friendliness and have become main power supply devices for electric apparatuses, for example, electric vehicles.

High performance of lithium-ion power batteries is inseparable from the support of the manufacturing process. A high-precision manufacturing process not only realizes the high performance of lithium-ion traction batteries, but also ensures the stability of their performance. Charge and discharge functions of a lithium-ion traction battery are achieved by an electrolyte, a tab, and an electrode plate. The electrode plate, as a part for communicating the electrolyte and the tab, determines electrochemical performance of the lithium-ion traction battery. Therefore, the manufacturing process of electrode plate is particularly important in the manufacturing process of lithium-ion traction battery.

Electrode plates are made by evenly coating a positive electrode current collector and a negative electrode current collector with respective slurries. Therefore, the manufacturing process of electrode plate is also called coating process. Even thickness of slurry applied onto electrode plates determines quality of the electrode plates. Uneven thickness of slurry applied onto electrode plates is apt to cause battery failure, thereby causing lithium-ion traction battery failure.

In an ideal case, a prepared slurry can be evenly applied onto a positive electrode current collector and a negative electrode current collector through the coating process. However, in an actual manufacturing process, thickness of slurry applied is hard to control. This is because during operation of coating equipment, the equipment is prone to fluctuation. For example, circular run-out produced by a coating roller 21 itself makes a distance between it and a coating die 22 fluctuate, and current collectors are coated with slurry when going through between the coating roller 21 and the coating die 22. Therefore, a distance change between the coating roller 21 and the coating die 22 caused by the circular run-out of the coating roller 21 results in uneven thickness of slurry on electrode plates, so as to impact quality of the electrode plates, thereby impacting service life of lithium-ion traction batteries, and even causing accidents and endangering life in more severe cases.

Therefore, the embodiments of this application provide a coating apparatus 1 so as to resolve the problem of uneven coating thickness caused by the circular run-out of the coating roller 21.

The coating apparatus 1 described in the embodiments of this application can be used for manufacturing an electrode plate. The electrode plates manufactured by such coating apparatus can be used for forming an electrode assembly which can be used for manufacturing a battery. Such battery is applicable to various electric apparatuses. The electric apparatus may be vehicles, mobile phones, portable devices, notebook computers, ships, spacecrafts, electric toys, electric tools, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, and an electric toy airplane. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

The coating apparatus 1 provided in this embodiment of this application includes:
  a coating module 2, where the coating module 2 includes a coating roller 21 and a coating die 22, the coating roller 21 is configured to drive, when rotating, a substrate 11 to move toward the coating die 22, and the coating die 22 is configured to apply a coating 12 onto the substrate 11;
  an error acquisition module 3, having a predetermined distance to the coating roller 21 and configured to acquire a circular run-out error 13 of rotation of the coating roller 21 and transmit the circular run-out error 13 to a linkage module 4; and
  the linkage module 4, configured to adjust position of the coating die 22 in real time according to the circular run-out error 13 transmitted to a linkage module 4, so as to keep a distance between the coating roller 21 and the coating die 22 unchanged.

FIG. 1 is a schematic structural diagram of a coating die according to an embodiment of this application. For example, as shown in FIG. 1, the coating roller 21 is a cylinder circumferentially rotating around a central axis of the cylinder in a radial direction, where speed of the circumferential rotation determines speed of the substrate 11 moving toward the coating die 22. The coating die 22 has a discharge port 23, where the discharge port 23 faces the coating roller 21, and the substrate 11 can go through a gap between the coating roller 21 and the discharge port 23 of the coating die 22.

Specifically, a distance value of the gap can be determined based on thickness of the substrate 11 and coating thickness of a single surface of the substrate 11. For example, the substrate 11 is an aluminum foil or a copper foil of 10 μm to 20 μm, a coating thickness of a single surface is 70 μm to 80 μm, and thus the distance value of the gap may be in a range of 100 μm to 200 μm.

The electrode plate is obtained by coating the substrate 11 with the coating 12. For example, the coating 12 applied onto the positive electrode plate may be lithium manganate or lithium iron phosphate, and the coating 12 applied onto the negative electrode plate may be graphite or silicon. The substrate 11 is a positive electrode current collector or a negative electrode current collector. For example, the positive electrode current collector may be an aluminum foil, and the negative electrode current collector may be a copper foil or a nickel foil. This is not limited in this application.

The substrate 11 is placed flatly on a side surface of the coating roller 21 and is transferred toward the coating die 22 by the coating roller 21. When the substrate 11 is transferred to the discharge port 23 of the coating die 22 by the coating roller 21, the substrate 11 is coated with the coating 12 by the coating die 22. The even thickness of the coating 12 applied onto the substrate 11 needs to be ensured so as to have a relatively high quality of electrode plates. However, in the manufacturing process of electrode plate, because an extremely high accuracy is required for coating, any slight fluctuation in the equipment may result in huge errors, especially the circular run-out error 13 of the coating roller 21.

Figure 2:
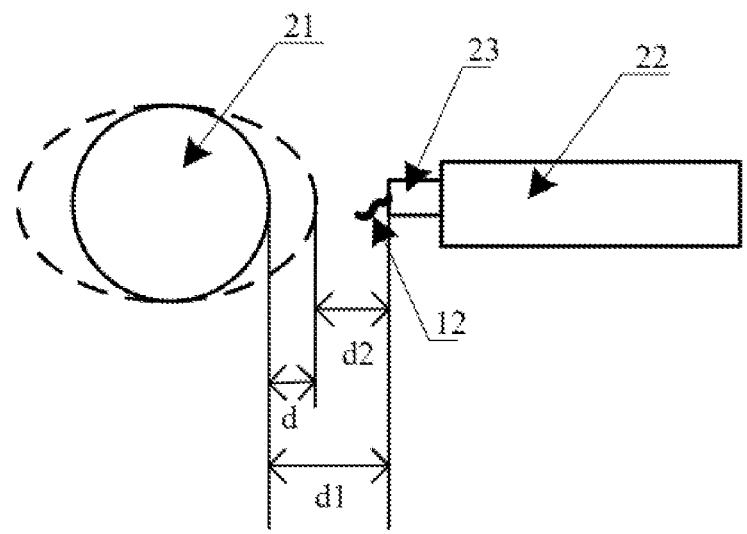
FIG. 2 is a schematic diagram of circular run-out of a coating roller according to an embodiment of this application.

FIG. 2 is a schematic diagram of circular run-out of a coating roller according to an embodiment of this application. As shown in FIG. 2, the coating roller 21 is hard to be processed into a standard cylinder satisfying a magnitude required by the coating process, thus making the coating roller 21 fluctuate obviously in the radial direction during circumferential rotation. In addition, during operation of the coating roller 21, a machine drives the coating roller 21 to rotate through a motor, causing the coating roller 21 to have some vibration which may in turn cause fluctuation in the coating roller 21 in the radial direction. Under the action of the preceding factors, the distance between the coating roller 21 and the discharge port 23 of the coating die 22 changes from d1 into d2, and a change value of the distance $d=d1-d2$ is thus the circular run-out error 13 caused by the coating roller 21. Fluctuation in the coating roller 21 directly impacts the distance between the coating roller 21 and the discharge port 23 of the coating die 22, causing fluctuation in quantity of the coating 12 applied onto the substrate 11 at the discharge port 23, thereby resulting in changes in thickness of the coating 12.

For example, when the circular run-out error 13 of the coating roller 21 is 3 μm, the circular run-out of the coating roller 21 cannot be observed by naked eyes. However, for the substrate 11 having an ideal coating thickness of 70 μm, the circular run-out error 13 may cause the coating thickness to fluctuate from 67 μm to 73 μm, leading to obviously uneven thickness of electrode plates when the electrode plates are wound together in winding process, thereby impacting service life and safety performance of the produced battery.

Therefore, in the coating apparatus 1 provided in this embodiment of this application, the error acquisition module 3 can acquire the error in the coating process through acquiring the circular run-out error 13 of the coating roller 21 so as to provide data support for reducing error through adjusting the equipment.

Figure 3:
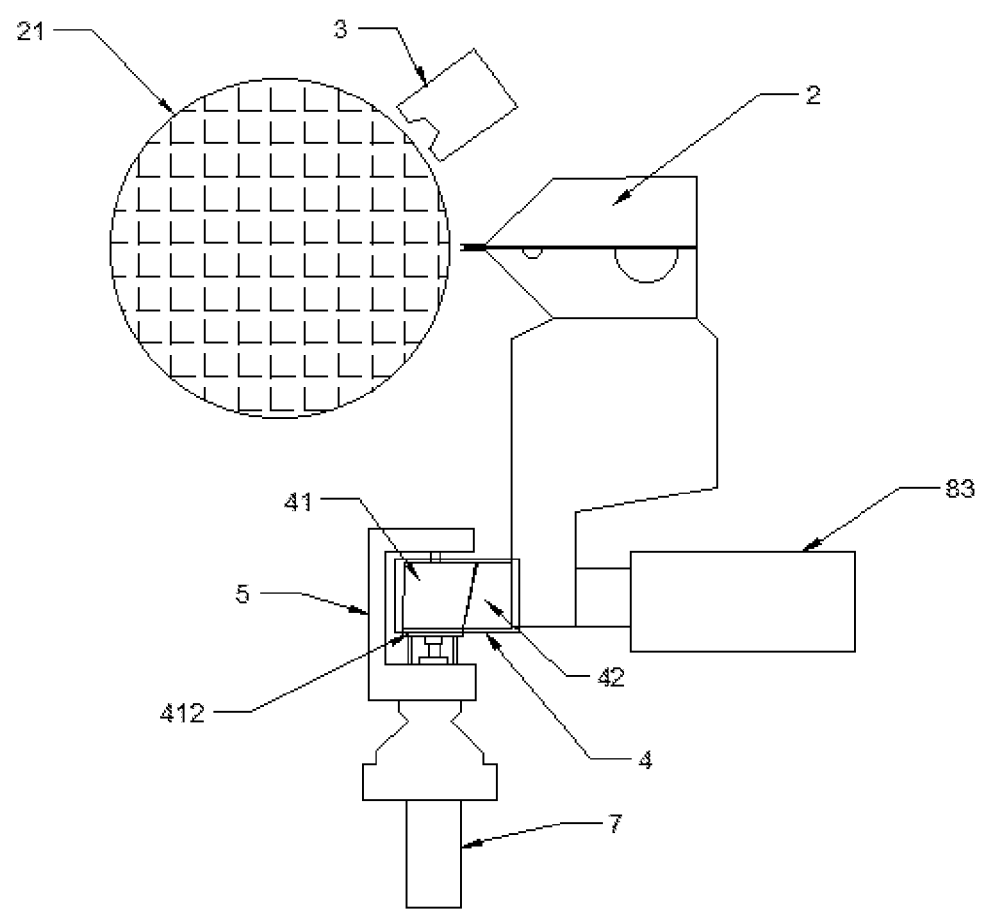
FIG. 3 is a schematic structural diagram of a coating apparatus according to an embodiment of this application.

FIG. 3 is a schematic structural diagram of a coating apparatus according to an embodiment of this application. As shown in FIG. 3, the error acquisition module 3 may be disposed at a position above the coating roller 21 close to the discharge port 23 and has a predetermined distance to the coating roller 21. For example, the predetermined distance may be 25000 μm. The coating roller 21 has an ideal operation state in which when the coating roller 21 has circumferential rotation, the distance of the coating roller 21 to the discharge port 23 of the coating die 22 should always be unchanged. For example, the distance is 110 μm. Based on this, the error acquisition module 3 may acquire the circular run-out error 13 through acquiring the distance between the coating roller 21 and the error acquisition module 3. For example, when a measured distance between the coating roller 21 and the error acquisition module 3 is 24998 μm, and the predetermined distance is 25000 μm, the circular run-out error 13 is 2 μm. The error acquisition module 3 may alternatively acquire the circular run-out error 13 through acquiring the distance between the coating roller 21 and the coating die 22. For example, when a measured distance between the coating roller 21 and the coating die 22 is 113 μm, and the distance of the coating roller 21 to the discharge port 23 of the coating die 22 is 110 μm, the circular run-out error 13 is 3 μm. In addition, the error acquisition module 3 may alternatively acquire the circular run-out error 13 through directly acquiring the radial distance of the coating roller 21 during operation. This is not limited in this application.

For example, the error acquisition module 3 may alternatively be disposed at a position above the coating roller 21 and having a predetermined compensated distance to the discharge port 23 so as to measure the circular run-out error 13 in advance. This can avoid delay caused by adjustment when the linkage module 4 takes a relatively long time to adjust the position of the coating die 22. The compensated distance may be determined by both speed of circular motion of the coating roller 21 and time required for adjusting the position of the coating die 22.

The linkage module 4 and the coating module 2 may be fixedly connected, or may be in contact connection, where the coating die 22 in the coating module 2 is pushed to change position through transferring a force. The linkage module 4 has a communication connection with the error acquisition module 3, and the linkage module 4 can receive the circular run-out error 13 transmitted by the error acquisition module 3 to produce corresponding pushing force according to the circular run-out error 13, thereby pushing the coating die 22 to change corresponding position such that the circular run-out error 13 produced by fluctuation can be canceled by the coating die 22 when the coating roller 21 has the fluctuation in the radial direction.

Specifically, the linkage module 4 and the error acquisition module 3 may be connected through wired transmission manners such as optical fibers or data lines, or may be connected through wireless transmission manners such as bluetooth or hot spot. This is not limited in this application.

In the coating apparatus 1 provided in this embodiment of this application, the error acquisition module 3 acquires the circular run-out error 13 produced during operation of the coating roller 21, such that the linkage module 4 can directly adjust the position of the coating die 22 in real time according to the circular run-out error 13, so as to keep the distance between the coating roller 21 and the coating die 22 unchanged, thereby ensuring a constant thickness of the coating 12 applied when the substrate 11 goes through the coating die 22.

In some embodiments, the linkage module 4 includes:
an error compensation module 41, configured to push, according to the circular run-out error 13, a displacement transfer module 42 to produce displacement; and
the displacement transfer module 42, fixedly connected to the coating die 22, where displacement of the displacement transfer module 42 pushes the coating die 22 to move so as to adjust the position of the coating die 22.

As shown in FIG. 3, the right side of the error compensation module 41 is fixedly connected to the left side of the displacement transfer module 42, and the upper side of the displacement transfer module 42 is fastened to the coating die 22, so as to push the displacement transfer module 42 to move toward a corresponding direction at a corresponding distance and make the coating die 22 move toward a corresponding direction at a corresponding distance when the error compensation module 41 has left-and-right movement, thereby adjusting the position of the coating die 22.

Figure 4:
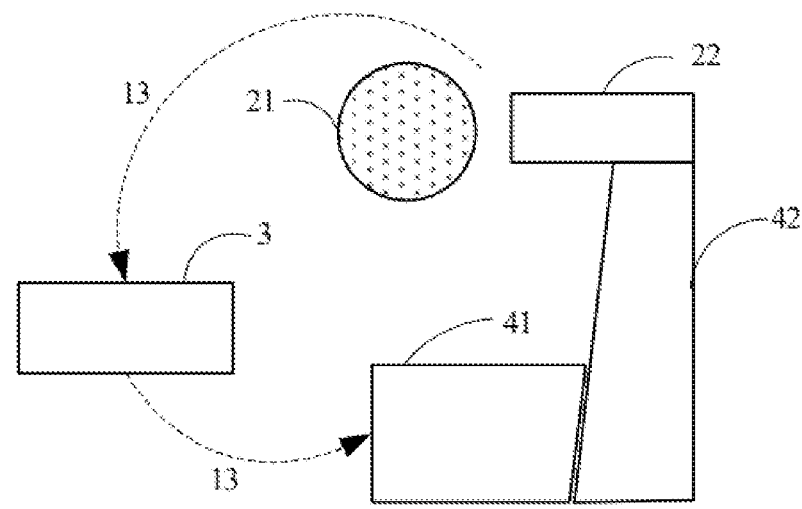
FIG. 4 is a schematic principle diagram of an error compensation module according to an embodiment of this application.

FIG. 4 is a schematic principle diagram of an error compensation module according to an embodiment of this application. For example, as shown in FIG. 4, the error compensation module 41 may be disposed at the left side of the displacement transfer module 42, and the error compensation module 41 and the displacement transfer module 42 are in contact with each other through a mutually cooperating inclined surface. The coating die 22 is disposed above the displacement transfer module 42, and the error acquisition module 3 has communication connection with the error compensation module 41.

The error acquisition module 3 acquires the circular run-out error 13 of the coating roller 21, and transmits the circular run-out error 13 to the error compensation module 41; and the error compensation module 41 has vertical displacement according to the circular run-out error 13 to push the displacement transfer module 42 to produce horizontal displacement, so as to cancel a distance error between the coating roller 21 and the coating die 22 caused by the circular run-out error 13 of the coating roller 21.

For example, the circular run-out error 13 may be −2 μm, meaning that the coating roller 21 moves 2 μm in a direction leaving away from the coating die 22 on a basis of a standard distance, and thus the error compensation module 41 pushes the displacement transfer module 42 to produce corresponding displacement to push the coating die 22 to move 2 μm in a direction approaching to the coating roller 21, such that the distance between the coating roller 21 and the coating die 22 is kept unchanged.

For example, the error compensation module 41 may also produce a horizontal pushing force according to the circular run-out error 13 to push the displacement transfer module 42 to produce horizontal displacement.

Figure 5:
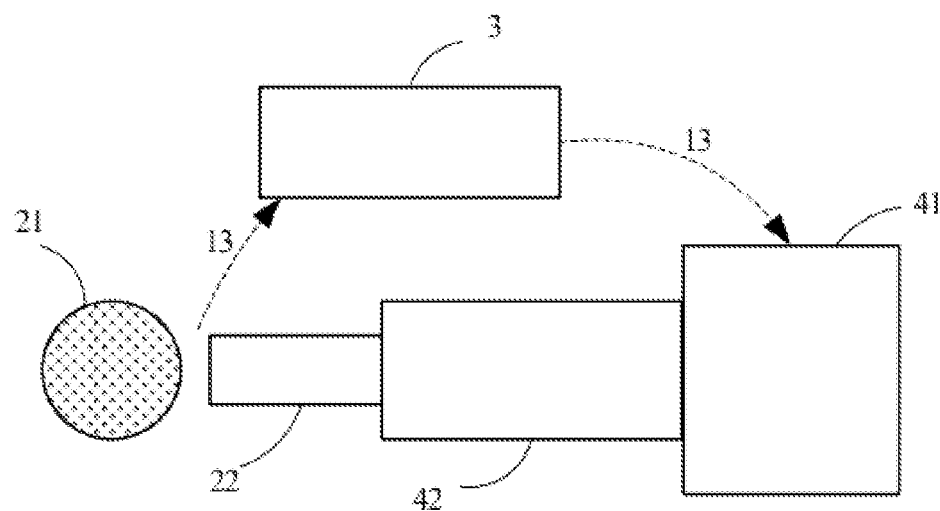
FIG. 5 is another schematic principle diagram of an error compensation module according to an embodiment of this application.

FIG. 5 is another schematic principle diagram of the error compensation module according to an embodiment of this application. For example, as shown in FIG. 5, the error compensation module 41, the displacement transfer module 42, and the coating die 22 are located in the same horizontal line, where the error compensation module 41 is disposed at the right side of the displacement transfer module 42, the error compensation module 41 and the displacement transfer module 42 are in contact with each other through a mutually cooperating inclined surface (not shown in the figure) or a perpendicular surface, the coating die 22 is disposed at the left side of the displacement transfer module 42, and the error acquisition module 3 has a communication connection with the error compensation module 41.

The error acquisition module 3 acquires the circular run-out error 13 of the coating roller 21, and transmits the circular run-out error 13 to the error compensation module 41, and horizontal displacement of the error compensation module 41 pushes the displacement transfer module 42 to produce horizontal displacement. For example, when the circular run-out error 13 indicates that the coating roller 21 has 3 μm offset to the left, the error compensation module 41 has 3 μm displacement to the left according to the circular run-out error 13 to push the displacement transfer module 42 to move 3 μm toward the left, so as to adjust the coating die 22 to offset 3 μm to the left, thereby canceling the distance error between the coating roller 21 and the coating die 22 caused by the circular run-out error 13 of the coating roller 21.

In the coating apparatus 1 provided in this embodiment of this application, the error compensation module 41 can produce corresponding displacement according to the circular run-out error 13 to push the displacement transfer module 42 to produce corresponding displacement. The displacement transfer module 42 is fixedly connected to the coating die 22, and thus displacement of the displacement transfer module 42 pushes the coating die 22 to correspondingly move, so as to adjust the position of the coating die 22 in real time according to the circular run-out error 13.

In some embodiments, the error compensation module 41 includes: a signal converter 411, configured to convert the circular run-out error 13 into a voltage signal and transmit the voltage signal to a piezoelectric ceramic 412; and the piezoelectric ceramic 412 deforming when receiving the voltage signal and configured to push the displacement transfer module 42 to produce displacement.

The signal converter 411 is an apparatus capable of converting a type of signal into another type. The signal converter 411 converts the circular run-out error 13 transmitted by the error acquisition module 3 from a distance signal into a voltage signal, such that the voltage signal can be input into the piezoelectric ceramic 412, and then stretching-and-contracting reaction of the ceramic body caused by applying voltage on the piezoelectric ceramic 412 is used to make the deformation of the piezoelectric ceramic 412.

The piezoelectric ceramic 412 may have high-frequency micro-deformation under the action of the voltage signal. With such feature, the signal converter 411 converts the circular run-out error 13 transmitted by the error acquisition module 3 into the voltage signal, and transmits the voltage signal to the piezoelectric ceramic 412 so as to drive the piezoelectric ceramic 412 to produce high-frequency micro-deformation, and thus push the first slider 4221 to have displacement, featuring simple structure and high accuracy of displacement.

Figure 6:
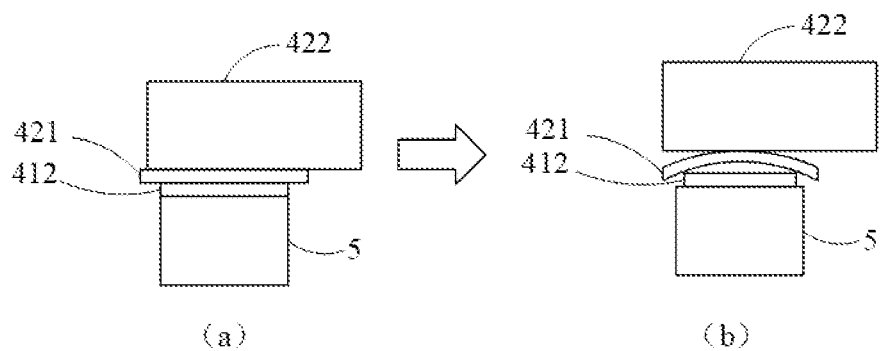
FIG. 6 is a schematic principle diagram of a piezoelectric ceramic according to an embodiment of this application.

FIG. 6 is a schematic principle diagram of a piezoelectric ceramic according to an embodiment of this application. FIG. (a) in FIG. 6 is a structure of the piezoelectric ceramic 412 before deformation, and FIG. (b) in FIG. 6 is a structure of the piezoelectric ceramic 412 after deformation. For example, as shown in FIG. 6, the piezoelectric ceramic 412 is fastened to the mounting base 5. When receiving the voltage signal transmitted by the signal converter 411, the ceramic has the high-frequency micro-deformation and then contracts. The schematic diagram of contraction effect is shown in FIG. (b) of FIG. 6. The ceramic contracting makes two ends of the elastic member which is fastened to the piezoelectric ceramic 412 contract inward, and as a result, the elastic member bulges to one side to deform. The sliding module 422 has displacement under the action of deformation of the elastic member, such that the sliding module 422 can be pushed to move through the piezoelectric ceramic 412 and the elastic member.

In the coating apparatus 1 provided in this embodiment of this application, the signal converter 411 converts a digital signal of the circular run-out error 13 into the voltage signal and inputs the voltage signal into the piezoelectric ceramic 412, and the piezoelectric ceramic 412 correspondingly has a deformation under the action of the voltage signal, so as to push a first slider 4221 tightly attached to the piezoelectric ceramic 412 to move. The piezoelectric ceramic 412 and the signal converter 411 cooperate to accurately adjust the position of the coating die 22 according to the circular run-out error 13, featuring a simple structure and high accuracy.

In some embodiments, the displacement transfer module 42 includes:
an elastic member, fastened to the piezoelectric ceramic 412, where deformation of the piezoelectric ceramic 412 pushes the elastic member to deform; and
a sliding module 422 in contact with the elastic member, where deformation of the elastic member pushes the sliding module 422 to have displacement; where
the sliding module 422 is fastened to the coating die 22 and configured to push the coating die 22 to move when the sliding module 422 is having displacement.

Specifically, one surface of the elastic member is in contact with the piezoelectric ceramic module 412, another surface of the elastic member is tightly attached to one surface of the sliding module 422, and another surface of the sliding module 422 is fastened to the coating die 22.

The elastic member can be fastened to the piezoelectric ceramic 412 by bonding, and when the piezoelectric ceramic 412 has the high-frequency micro-deformation, the elastic member correspondingly deforms under the action of a force, so as to push the sliding module 422 tightly attached to the another surface of the elastic member to have displacement, thereby making the coating die 22 fastened to the sliding module 422 move so as to adjust the position of the coating die 22.

For example, the elastic member may be an elastic metal sheet 421 and deforms when being subjected to a force. The elastic metal sheet 421 may be of rectangular shape, trapezoid shape, triangular shape, or the like, or may be a straight sheet or a curving sheet. This is not limited in this application.

In the coating apparatus 1 provided in this embodiment of this application, the elastic member fastened to the piezoelectric ceramic 412 is provided such that deformation of the piezoelectric ceramic 412 can be accurately sensed, increasing accuracy of transferring micro-deformation displacement, and the elastic member is fastened to the piezoelectric ceramic 412 such that the elastic member deforms with the piezoelectric ceramic 412, further ensuring accuracy of movement caused by the sliding module 422. Deformation of the elastic member pushes the sliding module 422 in contact therewith to move, so as to adjust the position of the coating die 22 fixedly connected to the sliding module 422.

In some embodiments, the sliding module 422 includes:
  a first slider 4221 in contact with the elastic member, where deformation of the elastic member pushes the first slider 4221 to have displacement; and
  a second slider 4222, having one surface in contact with the first slider 4221 and another surface fastened to the coating die 22, where displacement of the first slider 4221 pushes the second slider 4222 to have displacement, and displacement of the second slider 4222 pushes the coating die 22 to move to adjust the position of the coating die 22.

When the elastic member deforms, the first slider 4221 disposed in contact with the elastic member has displacement under the action of a force of deformation of the elastic member, and the first slider 4221 transfers the force produced by displacement to the second slider 4222 through the part attached to the second slider 4222 to push the second slider 4222 to produce displacement, so as to push the coating die 22 fixedly connected to the second slider 4222 to produce corresponding displacement, achieving the purpose of adjusting the position of the coating die 22 in real time according to the circular run-out error 13.

For example, the first slider 4221 vertically moves upward under pushing of the elastic member, and the second slider 4222 horizontally moves to the left following the first slider 4221 under the action of friction to maintain the attachment with the first slider 4221, so as to drive the coating die 22 fastened to the second slider 4222 to move leftward so as to adjust the position of the coating die 22.

For example, the contact surface between the first slider 4221 and the second slider 4222 is an inclined surface. As shown in FIG. 3, the lower side of the first slider 4221 is in contact with the elastic member, and a first surface on the right side of the first slider 4221 is tightly attached to a second surface on the left side of the second slider 4222, where the first surface and the second surface are inclined surfaces having the same angle. A larger inclination angle makes a larger contact area between the first slider 4221 and the second slider 4222, meaning that a larger force is required for the first slider 4221 to push the second slider 4222 to have displacement.

For example, the inclination angle may be in a range of 10° to 20°. A force on the first slider 4221 is lowered while ensuring that the first slider 4221 can push the second slider 4222 to vertically move.

The first inclined surface 42211 and the second inclined surface 42221 increase a stressed area between the first slider 4221 and the second slider 4222 and ensure that the displacement of the first slider 4221 accurately transfers the force produced by the displacement to the second slider 4222, so as to adjust the position of the coating die 22 in real time.

In the coating apparatus 1 provided in this embodiment of this application, the first slider 4221 is in contact with the elastic member, such that the first slider has displacement under the action of forces when the elastic member deforms, so as to push the second slider 4222 in contact with the first slider 4221 to have displacement, and because the second slider 4222 is mutually fastened to the coating die 22, the coating die 22 is pushed to move so as to adjust the position of the coating die 22.

In some embodiments, the displacement transfer module 42 further includes:
  a first needle roller 423, gripped between the first slider 4221 and the second slider 4222.

Figure 7:
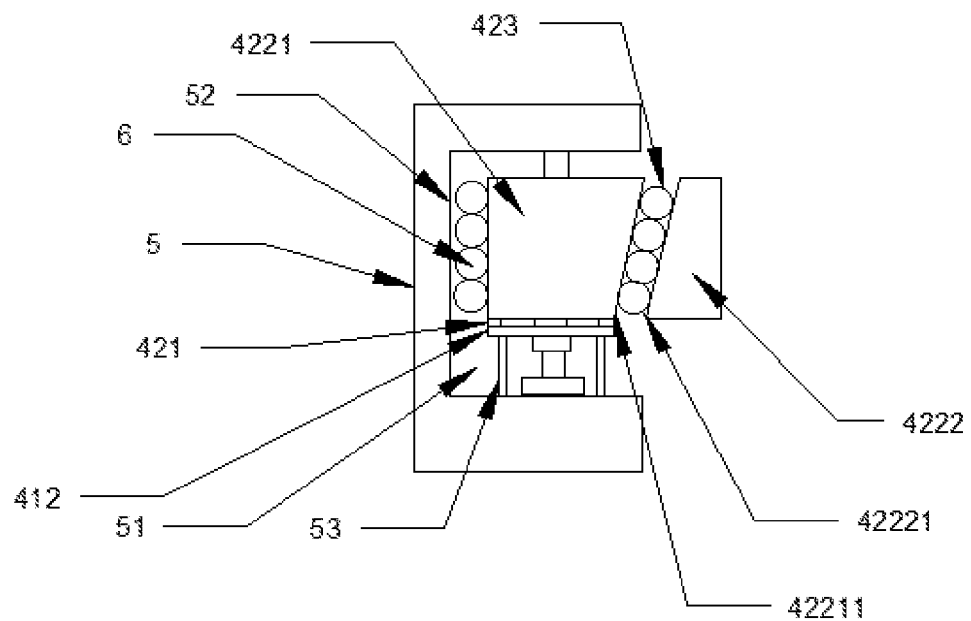
FIG. 7 is a schematic structural diagram of a sliding module according to an embodiment of this application.

FIG. 7 is a schematic structural diagram of a sliding module according to an embodiment of this application. As shown in FIG. 7, the first needle roller 423 includes four needle rollers, and the first needle roller 423 is located between the first surface on the right side of the first slider 4221 and the second surface on the left side of the second slider 4222. The first needle roller 423 transfers the acting force between the first slider 4221 and the second slider 4222, such that the second slider 4222 follows the first slider 4221 to move when the first slider 4221 moves.

The first needle roller 423 changes the surface contact between the first slider 4221 and the second slider 4222 into the line contact between the first needle roller 423 and the first slider 4221 and the second slider 4222, decreasing the contact area of the force and making the first slider 4221 more easily push the second slider 4222 to move, thereby increasing efficiency of the first slider 4221 pushing the second slider 4222 to move.

Specifically, the first needle roller 423 may include a plurality of needle rollers, and a quantity of the needle rollers may be determined based on the contact area between the first slider 4221 and the second slider 4222, or may be set according to user need. The quantity of the needle rollers contained in the first needle roller 423 is not limited in this embodiment of this application.

For example, the first surface and the second surface are inclined surfaces having the same angle, where the inclination angle of the inclined surfaces may be 76°.

The first needle roller 423 is in contact with the first slider 4221 and the second slider 4222 separately, such that the surface contact is changed from the surface contact between the first slider 4221 and the second slider 4222 into the surface contact between the first needle roller 423 and the first slider 4221 and between the first needle roller 423 and the second slider 4222, reducing the contact area when the first slider 4221 pushes the second slider 4222 to move, thereby improving efficiency of the pushing force produced by the displacement of the first slider 4221 on the second slider 4222. In this way, the coating apparatus 1 is more durable and saves more energy.

In the coating apparatus 1 provided in this embodiment of this application, the first needle roller 423 is provided between the first slider 4221 and the second slider 4222, such that surface contact between the first slider 4221 and the second slider 4222 is avoided, increasing durability of the equipment. In addition, the first needle roller 423 transfers an acting force, the first slider 4221 can push the second slider 4222 to have corresponding displacement in a relatively small force, facilitating accurately adjusting the displacement of the second slider 4222 according to a micron-level circular run-out error 13, making higher efficiency of transferring the pushing force, and effectively and accurately adjusting the position of the coating die 22.

In some embodiments, the first needle roller 423 is fastened to the first slider 4221 or the second slider 4222 so as to prevent the first needle roller 423 from dropping.

As shown in FIG. 7, the first needle roller 423 may be fastened to the first surface on the right side of the first slider 4221. In this case, the first needle roller 423 is in line contact with the second slider 4222. The displacement of the first slider 4221 makes the first needle roller 423 fastened to the first slider 4221 follow the first slider 4221 to move, so as to push the second slider 4222 in contact with the first needle roller 423 to move.

Alternatively, the first needle roller 423 is fastened on the second surface on the left side of the second slider 4222. In this case, the first needle roller 423 is in line contact with the first slider 4221. The displacement of the first slider 4221 pushes the first needle roller 423 fastened to the first slider 4221 to roll, so as to push the second slider 4222 fastened to the first needle roller 423 to move.

In the coating apparatus 1 provided in this embodiment of this application, the first needle roller 423 is fastened to the first slider 4221 or the second slider 4222, such that the first needle roller 423 can be prevented from dropping from between the first slider 4221 and the second slider 4222 during movement of the first slider 4221 or the second slider 4222, and the first slider 4221, the second needle roller 6, and the second slider 4222 have a firmer structure and a better cooperation, increasing reliability of the coating apparatus 1.

In some embodiments, the coating apparatus 1 further includes a mounting base 5 and a threaded rod 53.

The mounting base 5 is configured to fasten the piezoelectric ceramic 412.

The threaded rod 53 is configured to fasten the piezoelectric ceramic 412 to the mounting base 5.

The piezoelectric ceramic 412 may be fastened on the mounting base 5 through mechanical gripping or glue bonding. This is not limited in this application.

As shown in FIG. 7, the cross section of the mounting base 5 may be of square shape having one side opened and three sides enclosed to form an accommodating chamber 51 in which the piezoelectric ceramic 412, the elastic member, and the first slider 4221 are fastened. One surface on the right side of the first slider 4221 is exposed from the opening of the mounting base 5 and is disposed in contact with the second slider 4222.

It should be noted that the mounting base 5 mainly functions in providing positions for fastening the first slider 4221 and deforming modules. Therefore, shapes of both the mounting base 5 and the accommodating chamber 51 are not limited in this application. For example, the accommodating chamber 51 of the mounting base 5 may be of U shape having an opening on the right. The piezoelectric ceramic 412, the elastic member, and the first slider 4221 are located in the U-shaped accommodating chamber. The piezoelectric ceramic 412 is fastened to the mounting base 5, and the elastic member fastened to the piezoelectric ceramic 412 and the first slider 4221 in contact with the elastic member are placed in the U-shaped accommodating chamber of the mounting base 5, such that the positions and moving directions of the piezoelectric ceramic 412, the elastic member, and the first slider 4221 are limited, to make them move along the predetermined trajectory so as to adjust the position of the coating die 22.

Specifically, the piezoelectric ceramic 412 is fastened to the mounting base 5 through the threaded rod 53 such that the position of the piezoelectric ceramic 412 in the mounting base 5 can be changed through rotating the threaded rod 53, achieving relatively good fastening effect using a simple structure and changing the position of the piezoelectric ceramic 412 flexibly.

The elastic member is fastened to the piezoelectric ceramic 412 through bonding, and the first slider 4221 is in contact with the elastic member, such that the elastic member and the first slider 4221 are limited to move in the mounting base 5, so as to avoid, by fastening the piezoelectric ceramic 412, failure in position adjustment of the coating die 22 caused by the elastic member and the first slider 4221 sliding out of the predetermined displacement track, and in addition, make the positions of the elastic member and the first slider 4221 able to be changed by changing the position of the piezoelectric ceramic 412. The predetermined displacement track is a deforming direction of the deforming modules having high-frequency micro-deformation and a direction of pushing the first slider 4221 to move.

For example, as shown in FIG. 7, the piezoelectric ceramic 412, the elastic member, and the first slider 4221 are fastened in the U-shaped accommodating chamber of the mounting base 5 through the threaded rod, where the right side of the first slider 4221 is exposed from the opening of the U-shaped accommodating chamber, and the second slider 4222 is pushed to move through a second needle roller 6.

In the coating apparatus 1 provided in this embodiment of this application, the piezoelectric ceramic 412 is fastened to the mounting base 5, the movement space of the piezoelectric ceramic 412 can be limited so as to limit the movement space between the elastic member fastened to the piezoelectric ceramic 412 and the first slider 4221 in contact with the elastic member, increasing reliability of the equipment. The piezoelectric ceramic 412 is fastened to the mounting base 5 through the threaded rod 53, such that the position of the piezoelectric ceramic 412 can be flexibly adjusted so as to adjust the positions of the elastic member fastened to the piezoelectric ceramic 412 and limit the movement space and trajectory of the first slider 4221 in contact with the elastic member, preventing the first slider 4221 detaching from a predetermined displacement track, which causes the second slider 4222 unable to be pushed to have displacement and impacts adjustment of the position of the coating die 22.

In some embodiments, the coating apparatus 1 further includes: a second needle roller 6, gripped between the first slider 4221 and the mounting base 5.

It can be understood that when the first slider 4221 pushes the second slider 4222 to move, the second slider 4222 in turn may have a reacting force on the first slider 4221. Therefore, an object having a fixed position can be provided on the corresponding surface of the first slider 4221 in contact with the second slider 4222 to cancel such acting force.

As shown in FIG. 7, when the first slider 4221 moves, the first slider 4221 may produce a force on the first needle roller 423. Correspondingly, the first needle roller 423 may in turn produce a force having an opposing direction on the first slider 4221. Therefore, the second needle roller 6 is provided on another side (another surface opposite the first needle roller 423) of the first slider 4221 and is gripped between the first slider 4221 and the inner side wall 52 of the mounting base 5 to cancel the reacting force on the first slider 4221 produced by the first needle roller 423 and reduce the friction between the mounting base 5 and the second needle roller 6.

In the coating apparatus 1 provided in this embodiment of this application, the second needle roller 6 is provided between the first slider 4221 and the inner side wall 52 of the mounting base 5, such that the reacting force on the first slider 4221 produced by the first needle roller 423 is canceled, and the second needle roller 6 is gripped between the first slider 4221 and the inner side wall 52 of the mounting base 5, such that the reacting force can be canceled and the friction between the mounting base 5 and the second needle roller 6 is reduced.

In some embodiments, the coating module 2 further includes:
 a fastening apparatus 7, configured to fasten the coating die 22.

Figure 8:
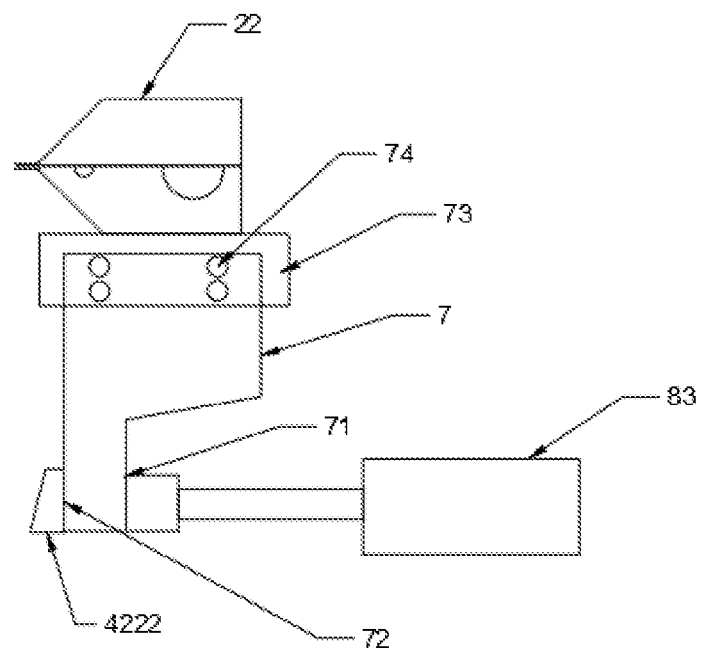
FIG. 8 is a schematic detailed structural diagram of a fastening apparatus according to an embodiment of this application.

FIG. 8 is a schematic detailed structural diagram of a fastening apparatus according to an embodiment of this application. As shown in FIG. 8, the fastening apparatus 7 includes the fastening apparatus 7 body, a base plate 73, and a screw 74, where the fastening apparatus 7 fixes the lower side of the coating die 22 to the upper side of the base plate 73 and the lower side of the base plate 73 to the upper side of the fastening apparatus 7 body by using the screw 74, so as to fix the coating die 22 to the fastening apparatus 7.

For example, the second slider 4222 may be fastened to the fastening apparatus 7 through bonding, clamping, or integrally forming. This is not limited in this application.

In the coating apparatus 1 provided in this embodiment of this application, the coating die 22 is fastened through the fastening apparatus 7 to push the coating die 22 to move during movement of the displacement transfer module 42, so as to adjust the position of the coating die 22.

In some embodiments, the error acquisition module 3 includes:
 a displacement sensor 31, having the predetermined distance to the coating roller 21, where the displacement sensor 31 is configured to measure a position change of the coating roller 21, and the position change indicates the circular run-out error 13.

For example, the displacement sensor 31 is a laser displacement sensor 31 which can accurately measure the circular run-out error 13, meeting the requirements of the coating apparatus 1 on accuracy.

Specifically, the error acquisition module 3 further includes a support 32 configured to fasten the displacement sensor 31. The displacement sensor 31 has the predetermined distance to the coating roller 21 and is configured to measure the position change of the coating roller 21, where the position change indicates the circular run-out error 13.

Figure 9:
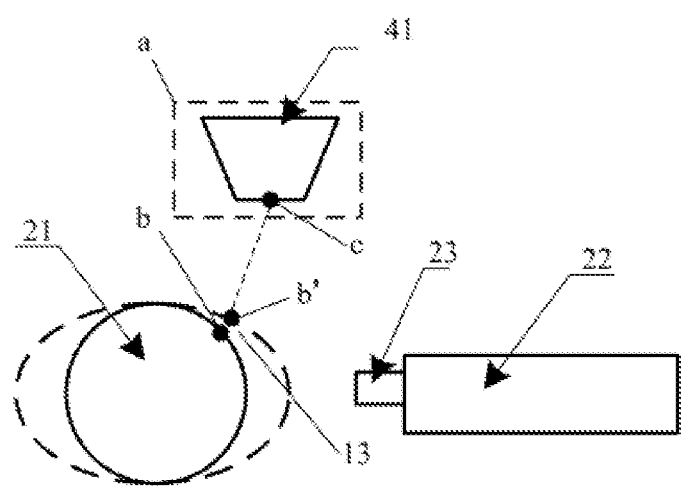
FIG. 9 is a schematic principle diagram of an error acquisition module according to an embodiment of this application.

FIG. 9 is a schematic principle diagram of an error acquisition module according to an embodiment of this application. As shown in FIG. 9, the support 32 is disposed at a position a above the coating roller 21, and the displacement sensor 31 is disposed on the support 32, where the position of the displacement sensor 31 is an observation point c having a predetermined distance to point b of the coating roller 21.

The position of the laser displacement sensor 31 is the observation point c. The laser displacement sensor 31 transmits laser from point c to point b, and determines a distance (that is, a distance between point b and point c) between the coating roller 21 and the laser displacement sensor 31 itself based on return time of the laser. Such distance being different from the predetermined distance means that the coating roller 21 has the circular run-out error 13 in the radial direction of point b, and the circular run-out error 13 can be acquired by calculating the difference of such distance and the predetermined distance.

As shown in FIG. 9, the circular run-out of the coating roller 21 causes the laser transmitted by the laser displacement sensor 31 to return at point b', thus making the distance acquired by the laser displacement sensor 31 fall in a range from b' to c, which is less than the distance between b and c, so as to acquire the circular run-out error 13 of the coating roller 21.

For example, the predetermined distance may be determined based on the optimal measurement range of the laser displacement sensor 31. For example, the predetermined distance may be 2 cm to 3 cm.

In the coating apparatus 1 provided in this embodiment of this application, the displacement sensor 31 having the predetermined distance to the coating roller 21 determines the distance between the coating roller 21 and the displacement sensor 31 itself, such that the circular run-out error 13 of the coating roller 21 can be directly acquired based on the distance between the coating roller 21 and the displacement sensor 31 and the predetermined distance.

Another embodiment of this application provides a coating system 8, including:
 the coating apparatus 1 according to any one of the foregoing embodiments; and
 a move apparatus 81, configured to move the coating die 22 to a predetermined position before the coating roller 21 drives the substrate 11 to move toward the coating die 22.

Specifically, as shown in FIG. 1, the predetermined position is a position, on the coating roller 21 closest to the discharge port 23, that the substrate 11 is driven by the coating roller 21 to move toward the discharge port 23 of the coating die 22 and reach. When the substrate 11 has moved to the predetermined position, the slurry comes from the discharge port 23 to be applied on the substrate 11.

In the coating apparatus 1 provided in this embodiment of this application, the coating die 22 of the coating apparatus 1 is moved to the predetermined position through the move apparatus 81, such that the position of the coating die 22 can be fixed flexibly and accurately based on needs, avoiding adverse factors in addition to the circular run-out error 13 presented between the coating roller 21 and the coating die 22, thereby increasing coating efficiency of the coating apparatus 1.

In some embodiments, the move apparatus 81 include an air cylinder and a servo motor 82.

Specifically, the servo motor 82 is fixedly connected to the mounting base 5 and is configured to adjust the position of the mounting base 5.

Figure 10:
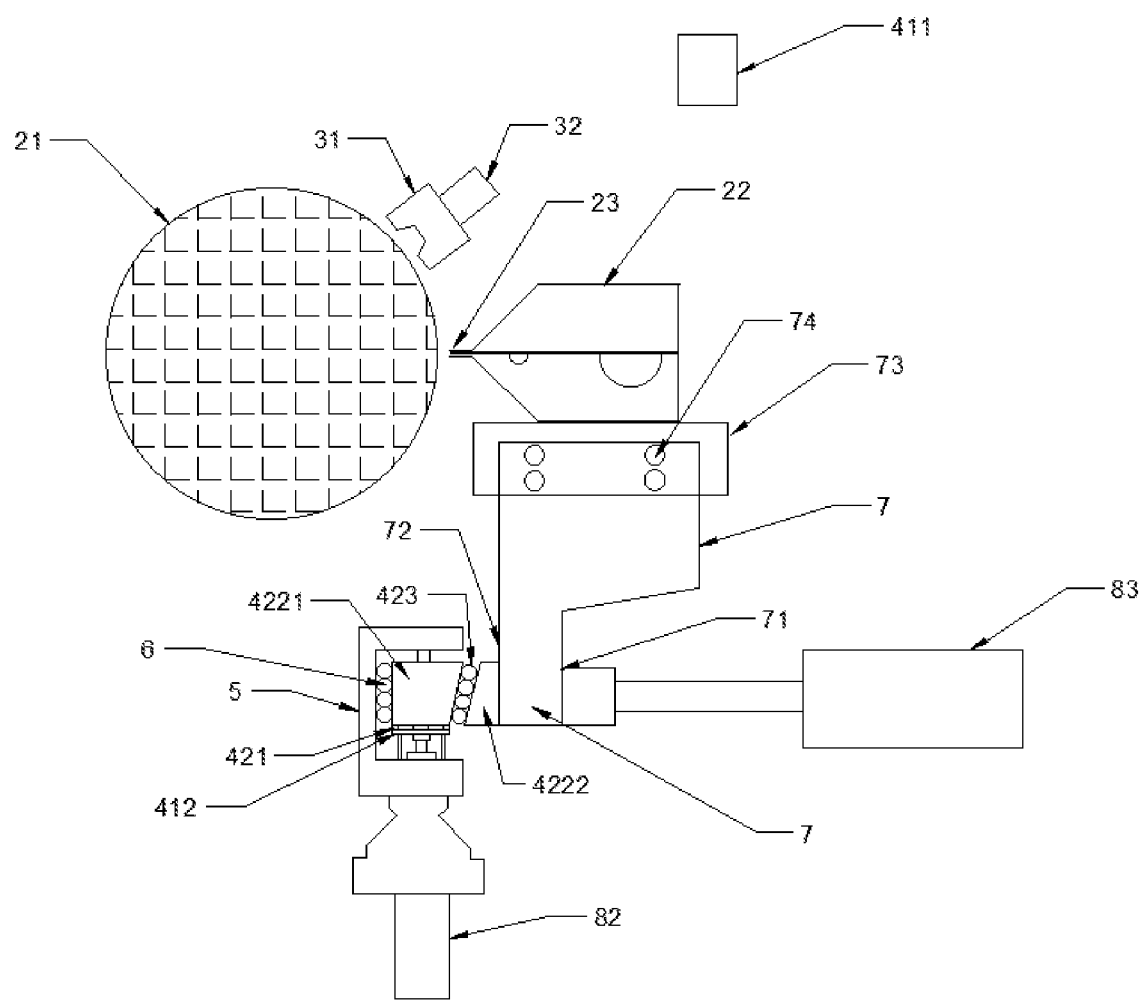
FIG. 10 is another schematic structural diagram of a coating apparatus according to an embodiment of this application.

FIG. 10 is another schematic structural diagram of a coating apparatus according to an embodiment of this application. As shown in FIG. 10, the servo motor 82 can control the position change correctly with high accuracy. When a large distance is presented between the coating roller 21 and the coating die 22, for example, in a debugging stage of the equipment, a relative distance between the coating roller 21 and the coating die 22 has not been thoroughly fastened, the servo motor 82, as a machine capable of changing the position of the mounting base 5, can accurately adjust the mounting base 5 to a proper position and adjust a relative distance between the first slider 4221 and the displacement transfer module 42 that are located in the accommodating chamber 51 of the mounting base 5 according to user needs.

In addition, the air cylinder may be fastened to a first side 71 of the fastening apparatus, and a second side 72 of the fastening apparatus is fastened to the linkage module 4, such that the fastening apparatus 7 can move under the action of the air cylinder and the linkage module 4 so as to adjust the position of the coating die 22 fastened to the fastening apparatus 7.

As shown in FIG. 10, the first side 71 of the fastening apparatus is fixedly connected to a piston rod of the air cylinder, where the air cylinder can change a position of the piston rod through adjusting air pressure so as to change the position of the fastening apparatus 7. The fastening apparatus 7 is fixedly connected to the coating die 22, where the coating die 22 follows the movement of the fastening apparatus 7 to move. The second side 72 of the fastening apparatus is fixedly connected to the second slider 4222 of the linkage module 4. When the second slider 4222 is pushed by the first slider 4221 to move, the fastening apparatus 7 is driven to move, so as to make the coating die 22 move, achieving real-time adjustment in the position of the coating die 22.

In the coating apparatus 1 provided in this embodiment of this application, providing the servo motor 82 which is fixedly connected to the mounting base 5 can adjust the relative distance between the first slider 4221 and the displacement transfer module 42 which are located in the accommodating chamber 51 of the mounting base 5 according to needs, so as to achieve a better cooperation between the first slider 4221 and the displacement transfer module 42. The fastening apparatus 7 is fastened to the air cylinder such that the air cylinder is used to adjust the position of the fastening apparatus 7, so as to adjust the position of the coating die 22 fixedly connected to the fastening apparatus 7. In addition, the fastening apparatus 7 being fixedly connected to the linkage module 4 can produce corresponding displacement when the linkage module 4 moves, so as to adjust the position of the coating die 22 in real time.

In conclusion, in the coating apparatus 1 and coater provided in this embodiment of this application, the error acquisition module 3 acquires the circular run-out error 13 of the coating roller 21, and a linkage apparatus is used to adjust the position of the coating die 22 in real time according to the circular run-out error 13, such that the coating die 22 moves in a direction of the circular run-out of the coating roller 21 to have displacement with the same magnitude as the circular run-out error 13, so as to cancel fluctuation in the distance between the coating roller 21 and the coating die 22 caused by the circular run-out of the coating roller 21, thereby ensuring that the distance between the coating roller 21 and the coating die 22 is kept unchanged so as to achieve even thickness of the coating 12 applied onto the substrate 11 by the coating die 22.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A coating apparatus, comprising: a coating module, the coating module comprising a coating roller and a coating die, wherein the coating roller is configured to drive, when rotating, a substrate to move toward the coating die, and the coating die is configured to apply a coating onto the substrate; an error acquisition module having a predetermined distance to the coating roller, configured to acquire a circular run-out error of rotation of the coating roller and transmit the circular run-out error to a linkage module; and the linkage module, configured to adjust position of the coating die in real time according to the circular run-out error transmitted to the linkage module, so as to keep a distance between the coating roller and the coating die unchanged;

wherein the linkage module comprises:

an error compensation module, configured to push, according to the circular run-out error, a displacement transfer module to produce displacement; and the displacement transfer module, fixedly connected to the coating die, wherein displacement of the displacement transfer module pushes the coating die to move so as to adjust the position of the coating die;

wherein the error compensation module comprises:

a signal converter, configured to convert the circular run-out error into a voltage signal and transmit the voltage signal to a piezoelectric ceramic; and the piezoelectric ceramic, deforming when receiving the voltage signal and configured to push the displacement transfer module to produce displacement;

wherein the displacement transfer module comprises:

an elastic member fastened to the piezoelectric ceramic, wherein deformation of the piezoelectric ceramic pushes the elastic member to deform; and a sliding module in contact with the elastic member, wherein deformation of the elastic member pushes the sliding module to have displacement;

wherein the sliding module is fastened to the coating die and configured to push the coating die to move when the sliding module is having displacement.

2. The coating apparatus according to claim 1, wherein the sliding module comprises:

a first slider in contact with the elastic member, wherein deformation of the elastic member pushes the first slider to have displacement; and a second slider having one surface in contact with the first slider and another surface fastened to the coating die, wherein displacement of the first slider pushes the second slider to have displacement, and displacement of the second slider pushes the coating die to move to adjust the position of the coating die.

3. The coating apparatus according to claim 2, wherein the displacement transfer module further comprises:

a first needle roller gripped between the first slider and the second slider.

4. The coating apparatus according to claim 3, wherein the first needle roller is fastened on the first slider or the second slider to prevent the first needle roller from dropping.

5. The coating apparatus according to claim 2, wherein the coating apparatus further comprises:
- a mounting base configured to fasten the piezoelectric ceramic; and
- a threaded rod configured to fasten the piezoelectric ceramic to the mounting base.

6. The coating apparatus according to claim 5, wherein the coating apparatus further comprises:
- a second needle roller gripped between the first slider and the mounting base.

7. The coating apparatus according to claim 1, wherein the coating apparatus further comprises:
- a fastening apparatus configured to fasten the coating die.

8. The coating apparatus according to claim 1, wherein the error acquisition module comprises:
- a displacement sensor having the predetermined distance to the coating roller, wherein the displacement sensor is configured to measure a position change of the coating roller, and the position change indicates the circular run-out error.

9. A coating system, comprising:
- the coating apparatus according to claim 1; and
- a move apparatus, configured to move the coating die to a predetermined position before the coating roller drives the substrate to move toward the coating die.

* * * * *